UNITED STATES PATENT OFFICE 2,373,597

ADHESIVE COMPOSITION AND METHOD OF ADHERING WAXED SURFACES

James R. Purdon, Akron, Ohio, assignor to The B. F. Goodrich Company, New York, N. Y., a corporation of New York No Drawing. Application April 7, 1941, Serial No. 387,265

10 Claims. (Cl. 154—40)

This invention relates to adhesive compositions and particularly to a novel adhesive composition especially adapted for adhering together sheets of waxed paper and similar materials.

Much work has been done in an effort to provide a satisfactory adhesive for securely bonding together sheets of waxed paper and the like but no entirely satisfactory adhesive has been produced prior to the present invention. I have discovered that waxed paper and similar materials may be adhered together securely and firmly by means of an adhesive composition having as its essential constituents an aqueous dispersion of rubber and corn syrup. The corn syrup may be added to the aqueous dispersion of rubber in widely varying proportions but preferably in proportions varying from 15 parts to 35 parts by weight of corn syrup per 100 parts by weight of the aqueous dispersion of rubber. Best results are obtained when from 20 to 25 parts by weight of corn syrup are added to each 100 parts of the aqueous dispersion of rubber. It is also desirable to add to the adhesive composition a minor proportion of a wetting agent to facilitate spreading of the composition on the waxed surface. Ordinarily, no more than 10 parts by weight of such wetting agent should be used for each 100 parts by weight of the aqueous dispersion of rubber. The composition desirably should be substantially free of ingredients other than those herein mentioned.

The aqueous dispersion of rubber may be any naturally occurring or artificially prepared colloidal dispersion of natural or synthetic rubber in a watery medium containing the usual naturally occurring or artificially added protective colloids, preservatives, stabilizing agents or similar conditioning agents. Any of the common agents for vulcanizing rubber also may be included in the composition when a vulcanized bond is desired. Preferably, however, the aqueous dispersion should be natural rubber latex, and superior adhesive compositions are obtained when a concentrated latex is used. Concentrated latex having a total solids content in excess of 50% is preferred.

The corn syrup used in the present invention conveniently may be the commercial household product sold uner the trade name "Karo" syrup. Either the light or the dark variety of corn syrup may be used without materially effecting the adhesive characteristics of the composition. The light syrup ordinarily is preferred, however, where a dark color in the adhesive would be undesirable.

The wetting agent used in the preferred compositions may be any of the numerous wetting agents now commonly sold and used in latex compositions. For example, the commercial product known as "Aquarex D" is very satisfactory. "Aquarex D" is understood to consist principally of sodium lauryl sulfate.

A typical adhesive composition adapted for adhering waxed paper may be prepared by thoroughly mixing 100 parts by weight of ammonia preserved, centrifugally concentrated latex containing 60% total solids together with 25 parts by weight of light "Karo" syrup and 2 parts by weight of "Aquarex D."

In using such a composition to adhere sheets of waxed paper together, one face of each sheet to be adhered is lightly coated with a film of the liquid adhesive composition and the composition is then dried until substantially all the water is driven therefrom. This may be accomplished by drying at room temperature or by subjecting to mild heat, for example, 150° F. for a short time. The adhesive coated surfaces are then pressed into intimate contact and allowed to dry further by standing under ordinary room conditions. The two sheets of waxed paper will be adhered together securely and firmly and the bond will have long lasting qualities.

Numerous modifications and variations in details of the invention as hereinbefore described may be effected without departing from the spirit and scope of the invention as defined by the appended claims.

I claim:

1. An adhesive for waxed paper and the like, said adhesive, comprising a free-flowing liquid composition having an aqueous continuous phase and containing an aqueous dispersion of rubber and corn syrup, the corn syrup being present in a quantity corresponding substantially to from 15 to 35 parts by weight per 100 parts of the aqueous dispersion.

2. An adhesive for waxed paper and the like, said adhesive comprising a free-flowing liquid composition having an aqueous continuous phase and containing natural rubber latex and corn syrup, the corn syrup being present in a quantity corresponding substantially to from 15 to 35 parts by weight per 100 parts of the latex.

3. An adhesive for waxed paper and the like, said adhesive comprising a free-flowing liquid composition having an aqueous continuous phase and containing natural rubber latex having a total solids content in excess of 50% and corn syrup in a quantity corresponding substantially to from 15 to 35 parts by weight per 100 parts of the latex.

4. An adhesive for waxed paper and the like, said adhesive comprising a free-flowing liquid composition having an aqueous continuous phase and containing 100 parts by weight of natural rubber latex and from 20 to 25 parts by weight of corn syrup.

5. An adhesive for waxed paper and the like, said adhesive comprising a free-flowing liquid composition having an aqueous continuous phase and containing 100 parts by weight of concentrated natural rubber latex having at least 50% total solids content and from 20 to 25 parts by weight of corn syrup.

6. An adhesive for waxed paper and the like, said adhesive comprising a free-flowing liquid composition having an aqueous continuous phase and containing an aqueous dispersion of rubber, corn syrup, and a wetting agent, the corn syrup being present in a quantity corresponding substantially to from 15 to 35 parts by weight per 100 parts of the aqueous dispersion of rubber.

7. An adhesive for waxed paper and the like, said adhesive comprising a free-flowing liquid composition having an aqueous continuous phase and containing 100 parts by weight of concentrated natural rubber latex, 15 to 35 parts by weight of corn syrup, and not more than 10 parts by weight of a wetting agent.

8. An adhesive for waxed paper and the like, said adhesive comprising a free-flowing liquid composition having an aqueous continuous phase and containing 100 parts by weight of concentrated natural rubber latex having a total solids content in excess of 50%, from 20 to 25 parts of corn syrup, and not more than 10 parts by weight of a wetting agent.

9. The method of adhering a waxed surface to another surface which comprises coating the waxed surface with a free-flowing liquid adhesive composition having an aqueous continuous phase and comprising an aqueous dispersion of rubber as a principal ingredient and corn syrup in a quantity corresponding substantially to from 15 to 35 parts by weight per 100 parts of the aqueous dispersion of rubber, drying the adhesive thereon, and pressing the adhesive-coated surface into intimate contact with the other surface.

10. The method of adhering a waxed surface to another surface which comprises coating the waxed surface with a free-flowing liquid adhesive composition having an aqueous continuous phase and comprising natural rubber latex as a principal ingredient and corn syrup in a quantity corresponding substantially to from 15 to 35 parts by weight per 100 parts of the latex, drying the adhesive thereon, and pressing the adhesive-coated surface into intimate contact with the other surface.

JAMES R. PURDON.